May 26, 1964      W. SMITH      3,134,542
AUTOMATIC TEMPERATURE CONTROL
Filed June 30, 1961
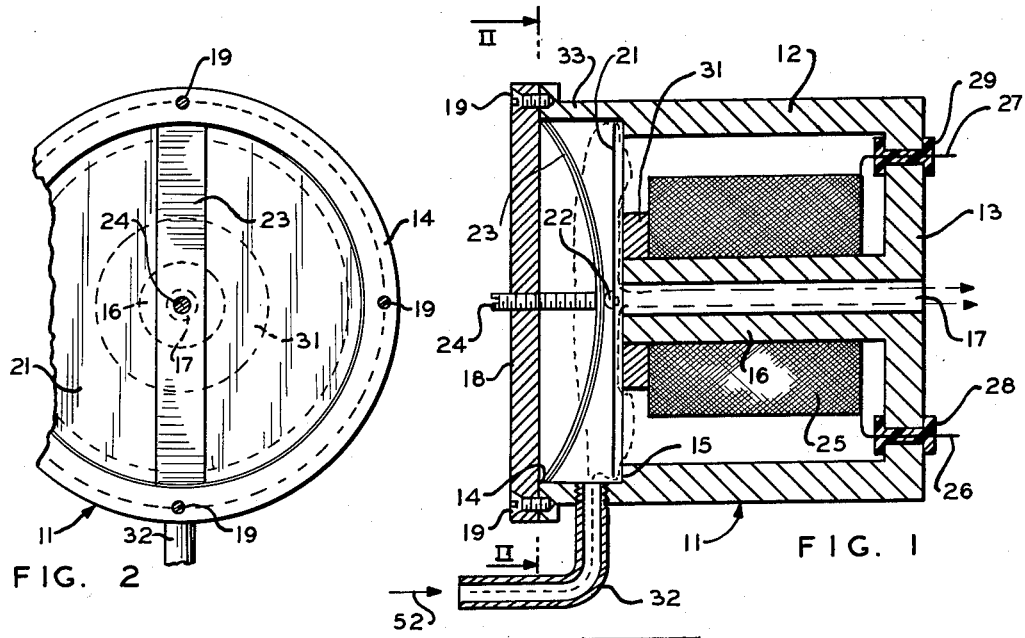
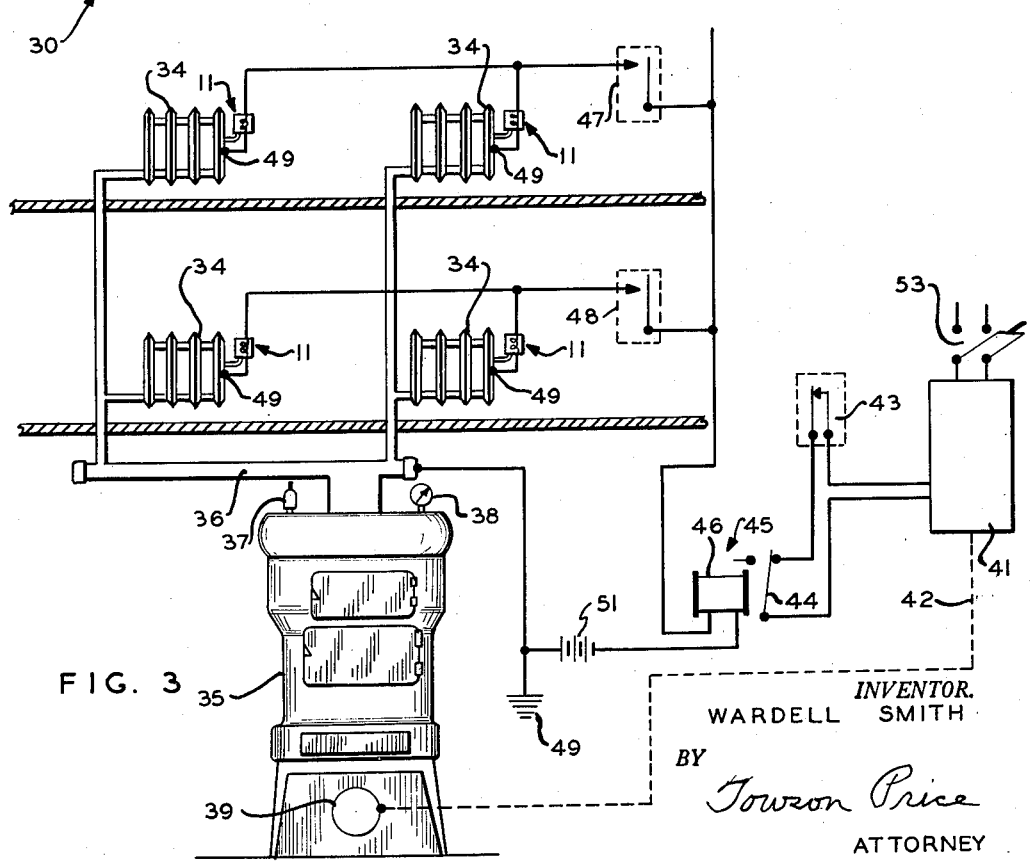
INVENTOR.
WARDELL SMITH
BY
Towson Price
ATTORNEY United States Patent Office 3,134,542
Patented May 26, 1964

3,134,542
AUTOMATIC TEMPERATURE CONTROL
Wardell Smith, 65 Glenwood Road, Upper Montclair, N.J.
Filed June 30, 1961, Ser. No. 121,057
11 Claims. (Cl. 237—10)

This invention relates to automatic temperature control and, more particularly, to a system for regulating the temperatures in different heating zones that are supplied from a common source of steam.

In automatically controlling temperatures in one or more rooms or zones for heating by a medium supplied from a single heating plant, one method has been to rely upon a centralized thermally-responsive device for regulating the flow of the heating medium to the heat-dispensing devices. Said responsive device is remotely located with respect to the individual dispensing devices and, following this method, portions of a room or zone exposed to cold winds, for example, cannot be maintained at a temperature substantially uniform with that of other portions or zones, which are not so exposed or which have auxiliary heating means, such as a fireplace.

Besides this, people in one apartment may desire a different room temperature than people in another apartment. Under the present practice, temperature control is accomplished by manually opening or closing radiator valves. Thus, a proper automatic distribution of heat in different enclosed areas is not obtainable and unnecessary fuel consumption results.

An object of my invention is to eliminate or supplement centralized thermostatic control by automatically controlling the temperature of zones in accordance with means disposed directly in each zone.

Another object of my invention is to provide a valve, for each radiator of a one-pipe steam system, which controls the flow of air from said radiator as the steam approaches, cutting off flow to the valve when its radiator is fully heated.

A further object of my invention is to provide control valves for steam radiators, which not only cut off the flow from said radiators when steam completely fills them, but also cut off the flow of air out of each radiator when the heating requirements of the containing zone have been satisfied.

A still further object of my invention is to provide a zone control system for steam-heating comprising a plurality of steam radiators disposed in a plurality of different zones for heating said zones to desired temperatures and supplied from a common source of steam, a thermostat in each zone for controlling the steam supply to radiators of said zone, a valve connected to each radiator for controlling the flow of air therefrom, with each zone thermostat electrically connected to the valves of all the radiators in its zone for cutting off the flow of air therefrom, and thereby stopping the flow of steam to said radiators, when the zone reaches the temperature for which its thermostat is set, each valve also having a heat-sensing device which cut off flow from its radiator when steam reaches said valve.

An additional object of my invention is to provide a zone-controlling system, as above set forth, wherein means are provided for entirely cutting off the steam from the common source only when the heat requirements of all of the zones have been satisfied.

These and other objects and advantages will become apparent from the following detailed description when taken with the accompanying drawings. It will be understood that the drawings are for purposes of illustration and do not define the scope or limits of the invention, reference being had for the latter purpose to the appended claims.

In the drawings, wherein like reference characters denote like parts in the several views:

FIGURE 1 is an axial sectional view of a steam radiator valve embodying my invention.

FIGURE 2 is a fragmentary transverse sectional view on the line II—II of FIGURE 1, in the direction of the arrows.

FIGURE 3 is a diagrammatic representation of a zone control system embodying my invention.

Referring to the drawings in detail, the first consisting of the valve generally designated 11 and illustrated in FIGURES 1 and 2. Said valve consists of a preferably hollow cylindrical or cup-shaped casing 12 desirably formed of magnetizable or ferrous material, closed at one end, as indicated by the bottom portion 13, and open at the other end as indicated at 14. The casing 12 is here provided with an interior annular shoulder 15 disposed near but spaced from said open end, and an interior coaxial hollow extension 16 projecting from the bottom 13, but terminating short of the plane of the open end 14. This extension provides an air-outlet passage 17 from a position short of the open end to the exterior of the closed end.

A non-magnetizable, desirably metal, cover 18 is provided for the open end of the casing and may be secured thereto by suitable fasteners such as screws 19 which pass therethrough and into the outer edge portion of the casing 12. When the parts of the valve are assembled, as illustrated, a resilient magnetizable diaphragm 21 is disposed adjacent to shoulder 15, and with a central portion overlying but normally spaced from the opening 17 at the inner end of the extension 16. This diaphragm may be made of sheet steel, desirably plated with copper or other non-rusting durable metal. If desired, the central portion may carry a rivet or boss 22.

Disposed between the cover 18 and the diaphragm 21 is a heat-sensing device 23, desirably in the form of a bi-metallic strip curved from its ends, which engage the cover 18, toward its center adjacent to the center of the diaphragm 21 or boss 22 thereon. The device 23, if a bi-metallic strip, has the metal of higher expansion on its convex side or that toward the extension 16. It is engaged by adjusting means 24, which desirably takes the form of a screw threaded through the central portion of the cover 18, for adjusting the position of the heat-sensing device 23 and the diaphragm 21 with respect to the extension 16.

Desirably, in order to accomplish all of the advantages of my invention, there is an electrical winding 25 mounted on the extension 16. It is supplied with electrical energy from leads 26 and 27 which pass through insulators 28 and 29 in the bottom portion 13 of the casing 12. This winding is desirably potted by entirely submerging it in a good grade of high temperature potting compound, such as epoxy or other suitable resin, not shown, to protect it from the action of steam. Also, to minimize chattering if the current supply to the winding is alternating, there is mounted around the inner end of the extension an annular member or ring 31 or copper or other metal member of high conductivity.

Connection of each valve 11 with its radiator is made by a pipe 32, one end of which is threaded into the portion 33 of reduced thickness beyond the shoulder 15. The other end portion of the pipe 32 desirably extends at a right angle to the valve-connected portion and is threaded into the upper portion of its radiator 34, as illustrated in FIGURE 3. As an alternative, the pipe 32 may pass through the cover 18. In this case, the valve 11 would stand with its axis vertical, rather than horizontal, with the closed end or bottom at the top, so that the connection would be from the radiator to the lower part of the valve to allow for return of condensed steam therefrom.

In a system of zone control as represented in FIGURE 3, there is a boiler 35 for supplying steam through pipes 36 to a plurality of radiators 34 in a building 30. In the present instance, I have illustrated only four radiators on two floors, with two radiators on each floor. However, it will be understood that the pipe 36 may continue to a third floor or higher and that each floor may contain a greater or lesser number of radiators than illustrated. The furnace may be provided with a conventional pressure-relief valve 37 and a pressure gage 38. It may have a suitable coal, oil or gas burner 39, controlled from a conventional control box 41 through line 42. The control box may also be connected to a normally-closed control thermostat 43 for the whole building 30, although this thermostat may be omitted if desired.

In series with the thermostat 43 is the armature 44 of a relay 45 in the form of a normally-closed contact. The coil 46 of the relay is in series with the normally-open zone thermostats 47 and 48, said thermostats, however, being in parallel with one another. Each thermostat 47 and 48 is in series with the windings 25 of the respective radiators in its control zone, said windings being in parallel with one another with one side being desirably grounded, as indicated at 49. The relay 45 and thermostats 47 and 48 are powered by suitable electrical means, here represented as a battery 51.

The operation of the system described is desirably as follows:

The flow of air from each radiator, as the steam comes on, follows the paths represented by the arrow 52 in FIGURE 1 and the dotted lines along the pipe 32 and in the casing 12. Air flows into the space between the diaphragm 21 and the cover 18, around the edges of the diaphragm, past the inner end of the extension 16, which serves as a magnetic pole piece, and out through the opening 17 in the closed end 13 of the casing 12. The rate of air flow can be adjusted by turning the screw 24 which bears against the rivet 22 or center of the diaphragm 21 to move both the device 23 and said diaphragm 21 with respect to the extension 16. The total movement of the diaphragm need only be a small amount, such as 1/32 inch. The screw member 24 adjusts the clearance thereof with respect to the pole pieces, that is, the extension 16 and the shoulder 15, when the valve is in an open position, thereby controlling the initial flow of air from the radiator, or that before either the thermal or the magnetic element operates. This adjustment is also to prevent the diaphragm 21 from falling so far away from the pole pieces that it is beyond the effective magnetic field thereof. In practice, the curvature of the thermal element 23 may be varied from that illustrated and might even be initially flat rather than bowed, as shown.

If steam appears before the thermostat controlling the radiator is satisfied, the bi-metal strip 23 will expand or flex to the right, as viewed in FIGURE 1, and press the diaphragm 21 against the extension 16, thereby preventing steam from escaping. If steam pressure continues to build up, the diaphragm will be pressed firmly in place, thereby preventing any steam from escaping, as the cross-section area of the aperture 17 is small, an example being about 1/4 inch in diameter, so that a very thin diaphragm will hold quite a high pressure.

The function of the winding 25, which may consist of about 3,000 turns of #30 B. & S. insulated wire, is to provide electrical closure of the outlet aperture 17 of the valve. Then, if the temperature of the zone where the valve is operating satisfies its control thermostat before steam appears at the valve in that pipe 32, an electrical current passes through the then-closed thermostat, and energizes the winding 25, magnetizing and drawing the diaphragm to the right, as viewed in FIGURE 1, to close the opening 17 through the extension 16.

This action completely shuts off the flow of air to the valve 11 thereby allowing the available steam to be diverted to another zone or group of zones. As any heating system, which is adequately radiated, will heat the building without much pressure, electrical closure of the valve due to the action of its control thermostat will, under normal conditions, take place before steam has appeared at the valve end of pipe 32.

Assuming that the building to be heated is below the desired temperature and that the thermostats 47 and 48 are set for the temperatures desired in each zone, which temperatures may vary in accordance with individual taste, current will pass through the closed terminals 44 of relay 45 and the main thermostat 43, if used. This will energize control box 41, supplied from a suitable source of power through switch 53 when closed, firing the burner 39 of boiler 35 and will cause steam to flow through the pipes 36 into radiators 34, thereby pushing out the air contained in the pipes and the radiators through the various valves 11.

As the air is exhausted and the radiators filled with steam, the temperatures of the zones will rise. The first zone to reach its desired temperature will cause the thermostat therein, in this case 47 or 48, to close a circuit through the windings 25 of its valves 11 so that no more air will be exhausted from the radiators in that zone, thus preventing more steam from entering said radiators. The steam, which is still being generated, will now be diverted to the other zone or zones. When all zone thermostats have been satisfied, the closing thereof will reduce the resistance in the circuit from the source 51, so that only then will the current through the relay coil 46 be sufficiently strong to cause said coil to draw the armature or contact 44 to its open position and shut off the system preparatory for the next cycle.

If the temperature in one of the zones decreases enough to cause opening of its thermostat, 47 or 48 in the present case, the armature or moving contact 44 will be released and effect closing of the circuit to the control box 41, thereby re-energizing the system and providing heat to only the zone which is calling for it. The other thermostat or thermostats which remain closed will stay that way and the exhaust of air from their radiators will stay shut off. If one of these closed thermostats should open during the warm-up cycle, heat will be supplied to that zone also. In order to turn off the heat in a given zone it is thus only necessary to lower the setting of the thermostat in that zone. It will, therefore, be seen that I have devised a simple but effective form of zone control for temperature regulation and, if desired, the system may be modified without departing from the invention.

Having now described my invention in detail in accordance with the patent statutes, those skilled in this art will have no difficulty in making changes and modifications in the individual parts or their relative assembly in order to meet specific requirements or conditions. Such changes and modifications may be made without departing from the scope and spirit of the invention, as set forth in the following claims.

I claim:

1. A valve comprising a hollow casing with one end open and the other closed, an interior extension having means forming a passage from the closed end to the interior of said casing, a cover over the open end of said casing and extension, a resilient diaphragm over the passage in said extension and positioned between said extension and said cover, a heat-sensing device disposed between said cover and diaphragm, adjusting means engaging said device for moving it and said diaphragm, and an air inlet pipe to the space between said cover and diaphragm for connection of said valve with a steam radiator to control the flow of air therefrom.

2. A valve as recited in claim 1, wherein the casing is provided with an interior shoulder disposed near but spaced from said open end, and the resilient diaphragm has a portion disposed over said shoulder.

3. A valve as recited in claim 1, wherein the heat-sensing device is a bi-metallic strip.

4. A valve as recited in claim 1, wherein the adjusting means is a screw.

5. A valve as recited in claim 1, wherein the casing and diaphragm are magnetizable and there is an electrical winding around said extension.

6. A valve for connection with a radiator to control the flow of air therefrom, comprising, a hollow casing of magnetizable material, said casing being closed at one end and open at the other and provided with an interior shoulder disposed near but spaced from said open end, an extension from the inner side of said closed end and provided with a passage therethrough from the exterior of said closed end to a positon short of the open end, a non-magnetizable cover over the open end of said casing, a resilient magnetizable diaphragm spaced from said open end, with a portion disposed over said shoulder and a portion disposed over the inner end of said passage, a heat-sensing device disposed between said cover and said diaphragm, adjusting means engaging said device for moving it and said diaphragm with respect to said extension, an electrical winding around said extension, and a radiator air inlet pipe opening to the space between said cover and diaphragm.

7. A valve for connection with a steam radiator to control the flow of air therefrom comprising a generally hollow cylindrical casing having an open end and a closed end, said casing formed of magnetizable material and provided with an interior peripheral shoulder disposed near but spaced from said open end, an interior coaxial extension of magnetizable material extending inwardly from said closed end, and provided with a passage therethrough from the exterior of said closed end to a position short of the open end, a non-magnetizable cover over the open end of said casing, a resilient magnetizable diaphragm spaced between said open end and said cover, and having a peripheral portion disposed over said shoulder and a central portion disposed over the inner end of the passage through said extension, a bi-metallic strip disposed between said cover when assembled and said diaphragm, an adjusting screw passing through said cover and engaging said strip for moving it and said diaphragm with respect to said extension, an electrical winding around said extension and with end portions passing out of said casing and insulated therefrom, and a radiator air inlet pipe opening to the space between said cover and diaphragm.

8. In a one pipe steam heating system having a plurality of steam radiators disposed in a plurality of different zones, and a common source of steam for said radiators for heating said zones, the improvement comprising an electrically operated valve connected to each radiator for controlling the flow of air therefrom, each valve being open when electrically de-energized and having means forming an air-outlet passage, a resilient diaphragm over said passage, a heat-sensing device engaging said diaphragm, and adjusting means for said device and diaphragm.

9. In a system as recited in claim 12, wherein each valve comprises a hollow casing with one end open and the other closed, an interior extension having means forming said air-outlet passage from the closed end to the interior of said casing, a cover over the open end of said casing and extension, said resilient diaphragm is over said extension and spaced from said cover, the heat-sensing device is disposed between said cover, and diaphragm, the adjusting means engages said device for moving it and said diaphragm with respect to said extension, and an air inlet pipe to the space between each cover and diaphragm and connecting each valve to its radiator.

10. In a one pipe steam heating system having a plurality of steam radiators disposed in a plurality of different zones, and a common source of steam for all of said radiators for selectively heating said zones to desired temperatures, the improvement comprising a thermostat in each zone for controlling the steam supply to said radiators, a valve connected to each radiator for controlling the flow of air therefrom, each zone thermostat being electrically connected to the valves of all the radiators in its zone for when closed cutting off the flow of air from, and thereby stopping the flow of steam to, said radiators, when the zone reaches the temperature for which it is set, each valve also having means forming an air-outlet passage, a resilient diaphragm over said passage, a heat-sensing device which engages said diaphragm and cuts off flow from its radiator when steam from said radiator reaches said valve, and means for entirely cutting off the steam from said common source only when the heat requirements of all of the zones have been satisfied.

11. In a system as recited in claim 10, wherein each valve comprises a hollow cylindrical casing of magnetizable material with one end open and the other closed, an interior peripheral shoulder disposed near but spaced from said open end, an interior axial extension of magnetizable material from said closed end, enclosed therein and through which said air-outlet passage extends from the exterior of said closed end to a position short of the open end, a non-magnetizable cover over the open end of said casing and extension, said resilient diaphragm is magnetizable and spaced from said open end, with a peripheral portion disposed over said shoulder and a central portion disposed over the inner end of the passage through said extension, said heat-sensing device is a bi-metallic strip disposed between said cover and said diaphragm, an adjusting screw passing through said cover and engaging said strip for moving it and said diaphragm with respect to said extension, an electrical winding around said extension, with end portions passing out of said casing and insulated therefrom, and an air inlet pipe connecting the space between the cover and diaphragm of each valve with its radiator to control the flow of air therefrom, and the electrical connections to the valves are to said windings.

References Cited in the file of this patent

UNITED STATES PATENTS

| | | |
|---|---|---|
| 885,683 | Armstrong | Apr. 21, 1908 |
| 1,658,104 | Stadelhofer | Feb. 7, 1928 |
| 2,038,435 | Lund | Apr. 21, 1936 |
| 2,177,649 | Goodale | Oct. 31, 1939 |
| 2,401,025 | Smith | May 28, 1946 |
| 2,860,850 | Rhodes et al. | Nov. 18, 1958 |